United States Patent
Leggett et al.

(10) Patent No.: US 9,301,117 B2
(45) Date of Patent: Mar. 29, 2016

(54) SMS COMMUNICATION DURING EMERGENCIES

(71) Applicant: TRITECH SOFTWARE SYSTEMS, San Diego, CA (US)

(72) Inventors: David J. Leggett, Hope Island (AU); Christopher David Maloney, Rancho Santa Fe, CA (US); Scott Michael MacDonald, Norfolk, MA (US); Mark David Hamilton, San Diego, CA (US); Erik Christian Loberg, Carlsbad, CA (US); Chen-Lu Meng, San Diego, CA (US); Ken D. Martin, Golden, CO (US)

(73) Assignee: TRITECH SOFTWARE SYSTEMS, San Diego, CA (US)

( * ) Notice: Subject to any disclaimer, the term of this patent is extended or adjusted under 35 U.S.C. 154(b) by 233 days.

(21) Appl. No.: 13/972,843

(22) Filed: Aug. 21, 2013

(65) Prior Publication Data
US 2015/0056946 A1    Feb. 26, 2015

(51) Int. Cl.
| | | |
|---|---|---|
| H04M 11/04 | (2006.01) | |
| H04W 4/22 | (2009.01) | |
| H04W 4/02 | (2009.01) | |
| H04W 4/14 | (2009.01) | |

(52) U.S. Cl.
CPC ........ *H04W 4/22* (2013.01); *H04W 4/02* (2013.01); *H04W 4/14* (2013.01)

(58) Field of Classification Search
CPC ..... H04W 4/22; H04W 76/007; H04W 88/06; H04W 64/00; H04L 69/08; H04L 67/18; H04M 1/72536; G08B 25/016; H04H 20/59
See application file for complete search history.

(56) References Cited

U.S. PATENT DOCUMENTS

| | | | |
|---|---|---|---|
| 7,751,826 B2 | 7/2010 | Gardner et al. | 455/456.1 |
| 8,145,183 B2 | 3/2012 | Barbeau et al. | 455/414.2 |
| 8,270,935 B2 | 9/2012 | Lee | 455/404.1 |
| 2005/0176441 A1 | 8/2005 | Jurecka | 455/456.1 |
| 2010/0174560 A1 | 7/2010 | Quan et al. | |
| 2010/0220840 A1* | 9/2010 | Ray et al. | 379/37 |
| 2010/0261492 A1* | 10/2010 | Salafia et al. | 455/466 |
| 2011/0086607 A1 | 4/2011 | Wang et al. | |
| 2011/0111726 A1* | 5/2011 | Kholaif et al. | 455/404.2 |
| 2012/0027189 A1 | 2/2012 | Shaffer et al. | |
| 2012/0149324 A1 | 6/2012 | Daly | 455/404.1 |
| 2012/0202447 A1 | 8/2012 | Edge et al. | |
| 2014/0007158 A1* | 1/2014 | Bhagwat | 725/33 |

OTHER PUBLICATIONS

PCT International Search Report and Written Opinion issued in corresponding PCT Application No. PCT/US2014/051952, mailed Nov. 24, 2014.

* cited by examiner

*Primary Examiner* — Xiang Zhang
*Assistant Examiner* — Edward Zhang
(74) *Attorney, Agent, or Firm* — Pillsbury Winthrop Shaw Pittman LLP (57) ABSTRACT

Systems and methods provide, to emergency operators at an emergency call center, the ability to communicate through textual messages with wireless mobile devices from which emergency voice calls have been placed. By virtue of such textual communication, callers using wireless mobile devices can receive emergency instructions and/or provide information about their current location.

16 Claims, 7 Drawing Sheets

SMS COMMUNICATION DURING EMERGENCIES

FIELD OF THE DISCLOSURE

This disclosure relates to providing, to emergency operators, communication through textual messages with callers using wireless mobile devices.

BACKGROUND

Conventionally, emergency phone calls are answered by an emergency call center, such as, e.g., a public safety answering point (PSAP). Operators at emergency call centers, also referred to as dispatchers or emergency dispatchers, may gather and/or attempt to gather information during emergency calls, including, but not limited to, the name of the caller, the nature of the emergency, the location of the emergency and/or the caller, and/or other emergency information. Operators may determine the appropriate type of first response, including but not limited to police, fire, medical, and/or other types of first response. Operators may contact a dispatcher for the determined type, e.g. a police dispatcher, fire dispatcher, medical dispatcher, and/or other type of dispatcher. In turn, the police dispatcher may contact appropriate emergency responders, such as one or more police officers that are on duty and, e.g., near the location of the emergency.

SUMMARY

One aspect of the disclosure relates to a system configured to provide, to emergency operators, communication through textual messages. The system may be controlled and/or guided programmatically by the functionality of its components, as described herein. The system may be configured to respond to incoming emergency voice calls being placed to an emergency call center.

The system may be hosted by and/or implemented on a server. Callers, operators, dispatchers, and/or emergency responders may interact and/or communicate with and/or through the system. Interaction and/or communication may be implemented by telephones, mobile devices, wireless devices, electronic devices, communication devices, client computing platforms, servers, and/or devices or systems that are combinations thereof. Interaction and/or communication with the system may be implemented over one or more networks, including, but not limited to, emergency communications networks, wired telephone networks, wireless telephone networks, cellular networks, the internet, and/or one or more other (communications) networks.

The system may include one or more of one or more servers, one or more emergency call centers, and/or other components. The server(s) may be configured to communicate according to a client/server architecture, a peer-to-peer architecture, a distributed architecture, and/or another suitable architecture or combination or architectures.

Callers, operators, dispatchers, and emergency responders may be referred to as users of the system. Users may access the system via landlines, wired telephones, wireless telephones, smartphones, mobile devices, wireless devices, electronic devices, communication devices, client computing platform(s), and/or other devices or combinations thereof, jointly referred to herein as client devices. Callers may generate emergency calls via emergency calling devices, including, but not limited to, any of the types of devices and/or systems included in this disclosure. In some implementations, emergency calling devices may include devices capable of one or more of placing voice calls, receiving textual messages, sending textual messages, accessing Internet addresses (e.g. uniform resource locator addresses or URL addresses), obtaining geolocation information, and/or other functionality as described in this disclosure.

As used herein, the term "textual message" and derivatives thereof may refer to one or both of a short message service (SMS) message and/or a multimedia messaging service (MMS) message. As used herein, the term "wireless mobile device" and derivatives may refer to devices capable of communication using a cellular network and/or wireless telephone network. Alternatively, and/or simultaneously, in some implementations, the term "wireless mobile device" and derivatives may refer to devices capable of being capable of communication in multiple different locations, away and apart from a single residence or a single stationary location. Examples of wireless mobiles devices include, but are not limited to, cellphones, smartphones, portable and/or handheld computing and/or communication devices, and/or other devices.

The server(s) may include electronic storage, one or more processors, and/or other components. The server(s) may be configured to execute one or more computer program modules. The computer program modules may include one or more of a call reception module, an outgoing message module, a transmission module, a presentation module, a web-hosting module, and/or other modules.

The call reception module may be configured to receive and/or monitor incoming emergency calls being placed to an emergency call center. Incoming emergency calls may include incoming emergency voice calls and/or other incoming emergency calls. Incoming emergency calls may be placed to an emergency call center through one or more emergency communication networks and/or other networks. Emergency calls may be produced, generated and/or originated by, from, and/or through callers using emergency calling devices. The call reception module may be implemented, embedded, combined, and/or integrated with one or more emergency call centers to accomplish the functions attributed in this disclosure to the call reception module. The incoming emergency calls may include a first call, a second call, a third call, and so forth. In some implementations, the call reception module may be configured to determine that an emergency call has been terminated prematurely, abruptly, before having been answered, or before an emergency operator has had adequate time to handle the emergency call. Any of these emergency calls may be referred to as an abandoned emergency call.

Emergency calls may be associated with different types of emergency information, including, but not limited to, caller information, subscriber information, household information, location information, one or more types of emergency, historical emergency information, and/or other information. Such information may have been gathered, determined, and/or processed in advance of an emergency call, for example through one or more databases that link telephone numbers to residence addresses. In some implementations, such information may be gathered, determined, and/or processed after an emergency call has been placed to an emergency call center. Subscriber information may include identification of the caller, such as, by way of non-limiting example, a telephone number, an IP address, information from one or more radio towers used in establishing the call, a billing address, a residence address, and/or other information.

Location information may include or be based on, by way of non-limiting example, geolocation information, current or last known geographical locations, current of last known (physical) addresses, one or more city blocks, a particular area of a city, town, county, and/or other geographical or governmental entity, global positioning system (GPS) information, Wi-Fi location information, available wifi networks, position systems based on wireless local area network (WLAN) technology, indoor positioning information, cell tower triangulation information, pseudo-location information, pseudo-GPS information, location within a building, store, campus, mall, and/or enclosed area, information from real-time location systems, position systems based on radio frequency identification (RFID) technology, position systems based on ultra wide band (UWB) technology, position systems based on angle of arrival (AoA) and/or time delay of arrival (TDoA), three-dimensional location information, position systems based on received signal strength indication (RSSI), and/or other location information or position systems, as well as combinations thereof. As used herein, the term "location information" may be used interchangeably with the term "geolocation information", and may refer to indoor locations and/or outdoor locations. In some implementations, geolocation information may be based on phase 1 type cellular information, phase 2 type cellular information, and/or other cellular information. Historical emergency information may include one or more of previous emergency calls from the same emergency calling device, the same caller, the same or similar location or geolocation, related emergency calling devices and/or client devices, related callers, and/or other information. For example, a single caller may have multiple telephones with different phone numbers. For example, a group of callers may live at the same address. These examples are not intended to be limiting in any way. Other types of relations between emergency calling devices, callers, locations, etc. are contemplated within the scope of this disclosure.

The outgoing message module may be configured to generate outgoing messages for transmission to telephones and/or other devices. The outgoing messages may include outgoing textual messages. In some implementations, outgoing messages may be generated for transmission to emergency calling devices, including but not limited to emergency calling devices from which an incoming emergency call has been received.

The transmission module may be configured to transmit and/or receive messages, including but not limited to textual messages, incoming messages, outgoing messages, and/or combinations thereof. In some implementations, the transmission module may be configured to transmit outgoing textual messages through one or more communications networks and/or other networks. In some implementations, the communications network used for transmission may be a different network than the communications network used, by the call reception module, to receive incoming emergency calls.

The presentation module may be configured to present incoming emergency voices calls to emergency operators through one or more user interfaces. The presentation module may be configured to present, display, render, generate, and/or implement (hereinafter referred to as "present," a "presentation of", and/or derivatives thereof) user interfaces for users to interact with the system. The user interfaces may include a set of user-selectable options. User-selectable options included in a user interface may correspond to different types of emergency, different types of information requested by an emergency operator, different types of information requested by a caller and/or other user (or expected to be helpful to the caller or other user), and/or other characteristics that are specific to an emergency call or caller. As used herein, the term "informational request" may be used to refer to different types of information requested by an emergency operator and/or different types of information requested from a caller and/or other user. One or more informational requests may be associated with an incoming emergency call. The presentation module may be configured to receive user input from emergency operators, for example to select one or more user-selectable options included in a user interface.

The web-hosting module may be configured to host a website, web page, web-application, mobile application, and/or other software application (jointly referred to as "web resources") that is accessible through the Internet. The web resources may be configured to query devices (including but not limited to wireless mobile devices) for geolocation information. For example, a particular wireless mobile device may receive, from the transmission module, a textual message that includes a uniform resource locator (URL) link to the web resources. The particular wireless mobile device may access, engage, interact with and/or activate the link, e.g. through execution of a browser software application on the particular wireless mobile device. Geolocation information may be transferred from the particular wireless mobile device to the web resources, implicitly and/or explicitly. The web resources may be configured to transmit and/or share received geolocation information with other constituent components of the system, e.g. in a manner such that the received geolocation information is available and/or accessible to emergency operators.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
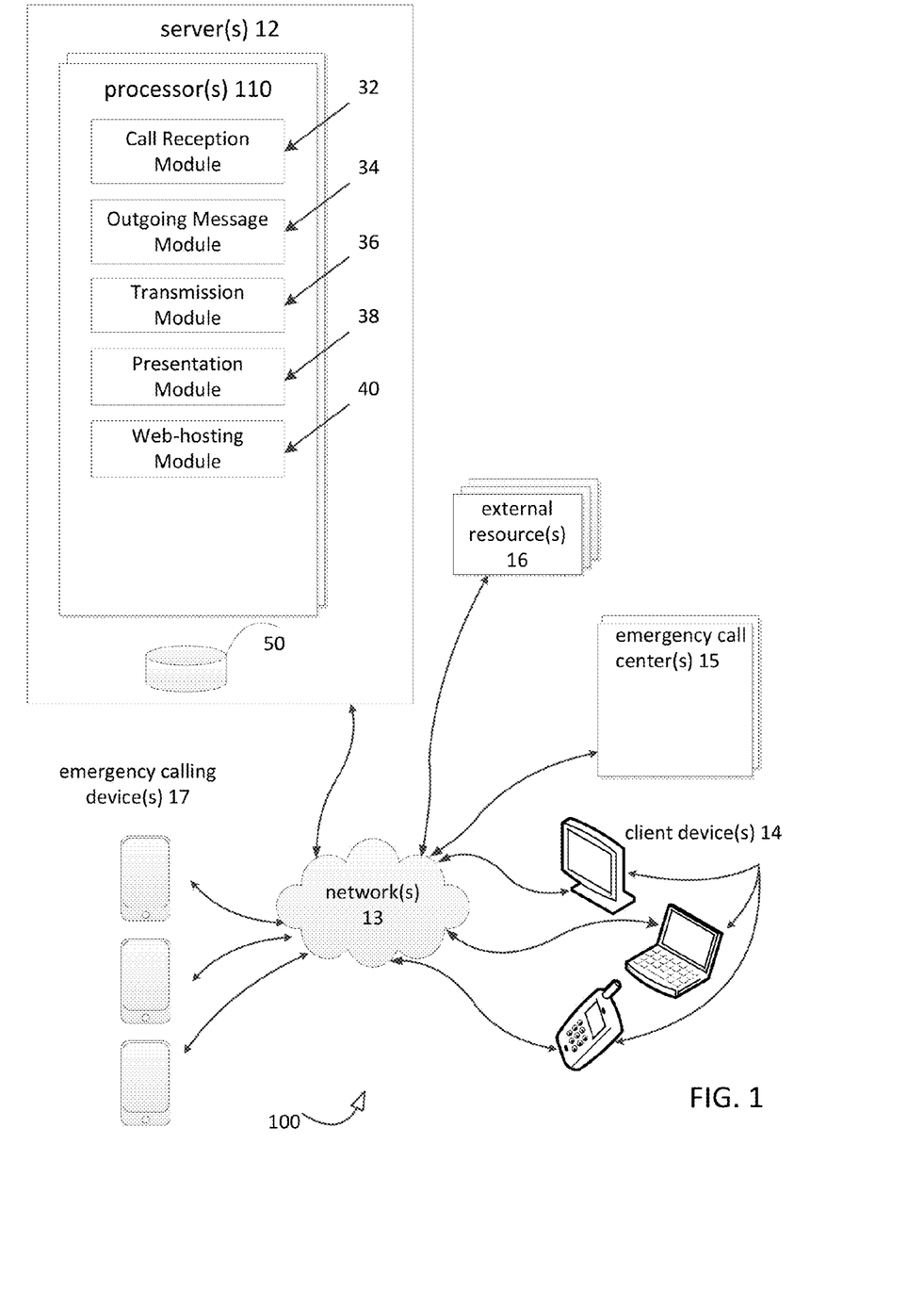
FIG. 1 illustrates a system configured to provide, to emergency operators, communication through textual messages, in accordance with one or more implementations.

FIG. 1 illustrates a system 100 configured to provide, to emergency operators, communication (and/or the ability to communicate) through textual messages, in accordance with one or more implementations. System 100 may include one or more servers 12, one or more emergency call centers 15, one or more client devices 14, one or more emergency calling devices 17, and/or other components.

Server(s) 12 may be configured to communicate with one or more client devices 14 and/or one or more emergency calling devices 17 according to, e.g., a client/server architecture. Components of system 100 may communicate over one or more networks 13. Communication may use techniques including, but not limited to, wired, wireless, and/or combinations thereof. In some implementations, system 100 may include communication using a peer-to-peer architecture. Users may access system 100 via client device(s) 14, emergency calling device(s) 17, and/or other devices.

Server(s) 12 may include electronic storage 50, one or more processors 110, and/or other components. Server(s) 12 may include communication lines, or ports to enable the exchange of information with one or more networks 13 and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may, at least in part, be implemented by a cloud of computing platforms operating together as server(s) 12.

In some implementations, server(s) 12, client device(s) 14, emergency calling device(s) 17, and/or external resources 16 may be operatively linked via one or more electronic communication links. For example, such electronic communication links may be established, at least in part, via one or more networks 13, including, e.g., the Internet and/or other networks. It will be appreciated that this is not intended to be limiting, and that the scope of this disclosure includes implementations in which server(s) 12, client device(s) 14, emergency calling device(s) 17, and/or external resources 16 may be operatively linked via some other communication media.

External resources 16 may include sources of information, hosts and/or providers of communication systems outside of system 100, external entities participating with system 100, and/or other resources. In some implementations, some or all of the functionality attributed herein to external resources 16 may be provided by resources included in system 100.

Server(s) 12 may be configured to execute one or more computer program modules. The computer program modules may include one or more of a call reception module 32, an outgoing message module 34, a transmission module 36, a presentation module 38, a web-hosting module 40, and/or other modules.

Call reception module 32 may be configured to receive and/or monitor incoming emergency calls being placed to an emergency call center 15. Incoming emergency calls may include incoming emergency voice calls and/or other incoming emergency calls. Incoming emergency calls may be placed to emergency call center 15 through one or more emergency communication networks and/or other networks (collectively referred to as network 13). Emergency calls may be produced, generated and/or originated by, from, and/or through callers using emergency calling devices 17. The call reception module may be implemented, embedded, combined, and/or integrated with one or more emergency call centers 15 to accomplish the functions attributed in this disclosure to call reception module 32. The incoming emergency calls may include a first call, a second call, a third call, and so forth. In some implementations, call reception module 32 may be configured to determine that an emergency call has been terminated prematurely, abruptly, before having been answered, or before an emergency operator has had adequate time to handle the emergency call. Any of these emergency calls may be referred to as an abandoned emergency call.

Outgoing message module 34 may be configured to generate outgoing messages for transmission to telephones and/or other devices. The outgoing messages may include outgoing textual messages. In some implementations, outgoing messages may be generated for transmission to emergency calling devices 17, including but not limited to emergency calling devices from which an incoming emergency call has been received. In some implementations, outgoing textual messages may include helpful information for the caller, including but not limited to emergency instructions that are specific to the caller's emergency. In some implementations, outgoing textual messages may include a link to helpful information, including but not limited to a uniform resource locator (URL) link. In some implementations, outgoing textual messages may include a request to the caller to provide information, e.g. information that the emergency operator expects to be helpful in the instant emergency. For example, helpful information may include, by way of non-limiting example, the current geolocation of the caller and/or the emergency.

In some implementations, a caller may provide requested information by replying to the outgoing textual message transmitted by system 100. Other ways to provide requested information are described in this disclosure. In some implementations, outgoing message module 34 may be configured to generate outgoing messages for transmission in response to an abandoned emergency call. In some implementations, outgoing messages for all or some types of abandoned emergency messages may be generated and/or transmitted automatically, autonomously, and/or otherwise without manual and/or human interaction. In some implementations, outgoing messages for all or some types of abandoned emergency messages may be generated and/or transmitted as instructed by an emergency operator. An outgoing message in response to an abandoned emergency call may include, by way of non-limiting example, a link, button, and/or otherwise selectable option to re-establish communication with an emergency call center 15. For example, communication with an emergency call center 15 may be established by dialing (or re-dialing) an appropriate emergency telephone number. Alternatively, and/or simultaneously, an outgoing message in response to an abandoned emergency call may include, by way of non-limiting example, a link, button, and/or otherwise selectable option to confirm that the abandoned emergency call may be ignored. For example, an abandoned emergency call may be ignored if the call was inadvertent and/or unintentionally placed.

Transmission module 36 may be configured to transmit and/or receive messages, including but not limited to textual messages, incoming messages, outgoing messages, and/or combinations thereof. In some implementations, transmission module 36 may be configured to transmit outgoing textual messages through one or more networks 13. In some implementations, the communications network used for transmission may be a different network than the communications network used, by call reception module 32, to receive incoming emergency calls.

Presentation module 38 may be configured to present incoming emergency voices calls to emergency operators through one or more user interfaces. Presentation module 38 may be configured to present, display, render, generate, and/or implement (hereinafter referred to as "present," a "presentation of", and/or derivatives thereof) user interfaces for users to interact with system 100. For example, user interfaces may be provided to users via client devices 14. The user interfaces may include a set of user-selectable options. User-selectable options included in a user interface may correspond to different types of emergency, different types of information requested by an emergency operator, different types of information requested by a caller and/or other user (or expected to be helpful to the caller or other user), and/or other characteristics that are specific to an emergency call or caller. One or more informational requests may be associated with an incoming emergency call. One or more informational requests may be associated with an abandoned emergency call. One or more informational requests may be included in an outgoing textual message, e.g. to provide information to a caller and/or to request a caller to provide information.

Presentation module 38 may be configured to receive user input from emergency operators, for example to select one or more user-selectable options included in a user interface. Presentation module 38 may be configured to receive one or more inputs (e.g. control inputs and/or command inputs) from an individual user that affect presentation of an individual user interface. The received inputs may include one or more selections from the offered set of user-selectable options. Alternatively, and/or simultaneously, a user interface may provide other ways for users to affect the presentation, including, but not limited to, textual input, touch screen gestures, pointer device input, and/or other ways for users to interact with a user interface.

In some implementations, an informational request may include information requested by a caller. For example, a caller may ask for step-by-step instructions on how to perform a Heimlich maneuver. In some implementations, an informational request may include information expected, e.g. by an emergency operator, to be helpful to a caller, e.g. in light of a specific emergency. For example, an information request may include instructions on how to perform cardiopulmonary resuscitation (CPR). In some implementations, an information request may include a link to information and/or instructions requested by (and/or expected to be helpful to) the caller. For example, CPR instructions may be included in a video link, such as a URL to an instruction video.

In some implementations, presentation module 38 may be configured to determine, obtain, and/or present personal information associated with an emergency call. Personal information may include one or more names, ages, gender, and/or other personal information associated with a caller, a registered user for a particular telephone number, a registered resident at a particular (billing) address, and/or other people. In some implementations, personal information may include historical emergency information, such as the names of one or more people that were in some way associated with a previous emergency call, which in turn is in some way related to a current emergency call. For example, if a particular caller has called on one or more previous occasions regarding a particular disturbance (by way of non-limiting example, a previous occasion may be related to domestic abuse) that involved one or more particular people, information to that effect may be relevant to emergency responders.

Figure 6:
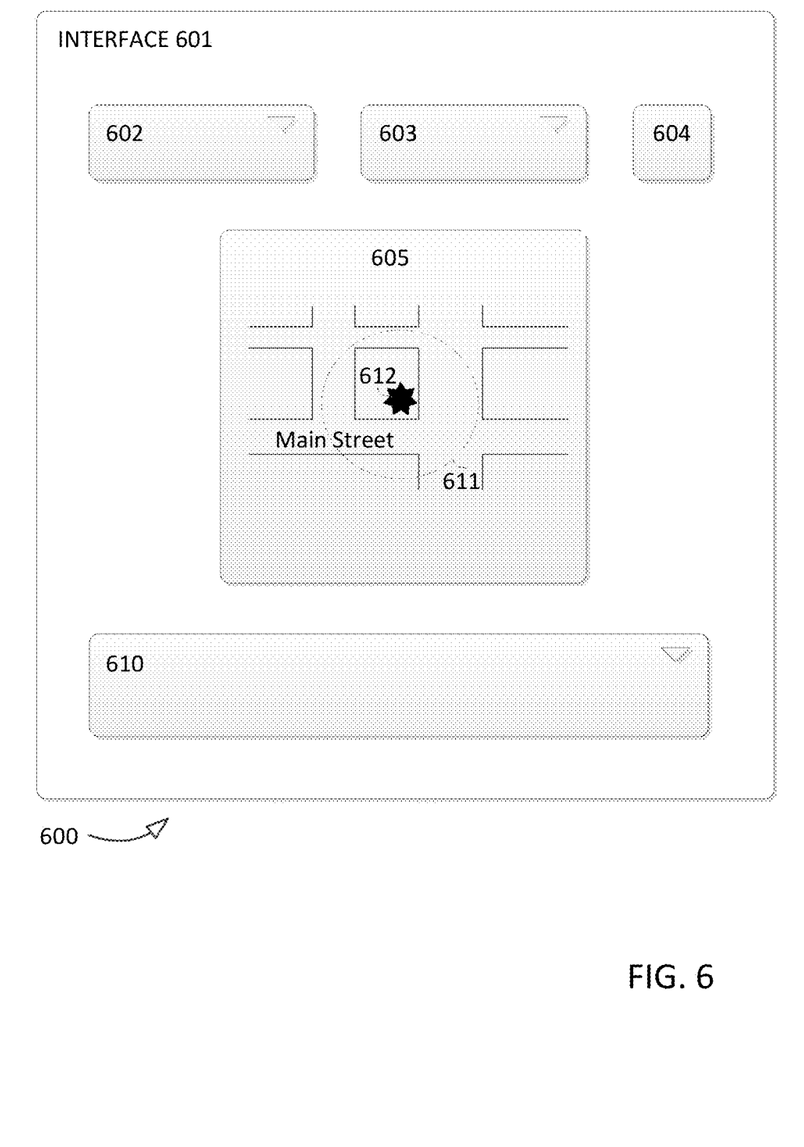
FIG. 6 illustrates a view of an exemplary interface for emergency operators, in accordance with one or more implementations.

By way of illustration, FIG. 6 illustrates a view 600 of a user interface 601 as presented to a particular user, e.g. an emergency operator. User interface 601 may be presented through a client device. User interface 601 may be presented in response to an emergency call being placed to and/or being handled by an emergency call center. In some implementations, a user interface similar to or the same as user interface 601 may be presented in response to abandonment of an emergency call (and/or an abandoned emergency call). This emergency call may be referred to as the current emergency call placed by the current caller using the current wireless mobile device, in reference to FIG. 6. Elements of user interface 601 may be implemented as fields configured to receive entry, selection, and/or confirmation from a user. The fields may include one or more of a text entry field, a set of selectable menu items, a selectable field, and/or other fields configured to receive entry, selection, and/or confirmation from a user. The number of elements, components, and/or (user-selectable) fields depicted in FIG. 6 is meant to be exemplary, and not limiting in any way. User interface 601 may be configured to present information to and/or enable interaction with the user viewing view 600.

User interface 601 of FIG. 6 may include interface elements 602 and 603, informational element 605, action button 604, an icon 612, secondary information element 610, and/or other components or features. Interface elements 602 and 603 may, e.g., be an object, interface, and/or other items that a user may interact with, such as a menu of user-selectable options and/or actions for engaging the system. For example, interface element 602 may display a set of different types of emergency that are available for selection by the emergency operator. For example, interface element 603 may display a set of informational requests that are available for selection by the emergency operator. In some implementations, the specific set of informational requests may depend, at least in part, on the selection made for interface element 602. For example, a user-selectable option for interface element 602 may include a car accident. A related user-selectable option for interface element 603 may indicate whether any passengers appear to be stuck or hurt, instructions for providing first-aid to a passenger thrown clear from a car, a request for the current caller to provide geolocation information, etc. Certain combinations of selections for interface elements 602 and 603 may cause the system to generate an outgoing textual message for transmission to the current caller and/or the current wireless mobile device. The generated outgoing textual message may include the specific informational request selected through interface element 603. Action button 604, upon activation by the emergency operator, may effect transmission of the generated outgoing textual message, e.g. as described elsewhere in this disclosure.

Secondary information element 610 may display information from one or more external sources, including but not limited to historical emergency information (e.g., as described elsewhere in this disclosure), personal information (e.g., as described elsewhere in this disclosure, in relation to a presentation module), information from one or more emergency responders to the current emergency (and/or related emergencies), information provided by the current caller (through textual message and/or through web resources hosted by a web-hosting module, e.g., as described elsewhere in this disclosure), and/or other pertinent information.

An area of user interface 601, e.g. the center as indicated by informational element 605 in FIG. 6, may present information about the current emergency call, if and when it is available and/or known to the emergency operator. Informational element 605 may include status information and/or a map of a particular geographical area, in particular an area relevant to the current emergency call. For example, the map may include streets and geolocation information. Icon 612 may indicate and/or represent a geolocation of the current emergency call and/or the current caller who generated the current emergency call. Icon 612 may have a particular color, shape, and/or graphically distinguishable characteristic such that a user may rapidly obtain relevant information about the current emergency call. In case of a transmitted outgoing textual message that includes a request, from the emergency operator to the current caller, to provide geolocation information, a reply, confirmation, and/or otherwise-provided information originating from the current caller and/or the current wireless mobile device may cause one or more changes in view 600. For example, the map within informational element 605 may be updated to reflect the provided geolocation information, icon 612 may be relocated as appropriate, the information displayed in secondary information element 610 may be updated, and/or other changes as appropriate may be apparent to the emergency operator.

A perimeter 611 may indicate the geographical area within a predetermined distance (in estimated time to reach the current emergency or space) of the geolocation indicated by icon 612.

Referring to FIG. 1, web-hosting module 40 may be configured to host a web-site, web page, web-application, mobile application, and/or other resources (jointly referred to as "web resources") that is accessible through the Internet and/or network 13. For example, the web resources may be accessible through a URL address. The web resources may be configured to query devices (including but not limited to wireless mobile devices and/or emergency calling devices 17) for geolocation information. For example, a particular wireless mobile device may receive, from transmission module 36, a textual message that includes a uniform resource locator (URL) link to the web resources. The particular wireless mobile device may access, engage, interact with and/or activate the link, e.g. through execution of a browser software application on the particular wireless mobile device. Geolocation information may be transferred from the particular wireless mobile device to the web resources, implicitly and/or explicitly.

In some implementations, the web resources may be configured to query wireless mobile devices for geolocation information through an application programming interface (API) function that accesses geolocation information (e.g., global positioning system (GPS) information, available wifi networks, radio tower triangulation information, and/or other location information, e.g. as described elsewhere in this disclosure). In some implementations, such functions may be natively supported within the wireless mobile device. For example, the web resources may prompt a user to press a button or other interface element to confirm and/or update the user's current geolocation. In some implementations, the web resources may have access to geolocation information without the need or requirement to prompt the user. The web resources may be configured to transmit and/or share received geolocation information with other constituent components of system 100, e.g. in a manner such that the received geolocation information is available and/or accessible to emergency operators and/or other users.

In some implementations, web-hosting module 40 may be implemented by an external server, for example a third-party web-server. Web-hosting module 40 may interact with other components of system 100 through network 13, in particular the Internet.

In some implementations, web-hosting module 40 and/or the web resources may be configured to interact with emergency calling devices 17 (e.g. wireless mobile devices) through one or more of the following steps. Web-hosting 40 and/or the web resources may receive a request, e.g. a Hypertext Transfer Protocol (HTTP) request, from a particular wireless mobile device (operated by a particular caller). Associated with the request and/or the particular wireless mobile device, web-hosting module 40 and/or the web resources may receive an identifier. The identifier may identify the request, the particular caller, and/or the particular wireless mobile device. In some implementations, the identifier includes one or more of a cookie, a user-identification (e.g., userid, UDID, and/or other identifier of the user, device, and/or software and/or hardware configuration of the particular wireless mobile device), a media access control (MAC) address, a telephone number, and/or another identifier. Web-hosting 40 and/or the web resources may transmit a response to the particular wireless mobile device that includes a query for geolocation information. The query may be performed through an application programming interface (API) function that accesses geolocation information (e.g., as described elsewhere in this disclosure). Responsive to such a query, web-hosting module 40 and/or the web resources may receive, from the particular wireless mobile device, the queried geolocation information. Web-hosting module 40 and/or the web resources may provide one or both of the received geolocation information and/or the received identifier (associated with the request described in this paragraph) to system 100, its constituent components, and/or one or more emergency operators. For example, the received geolocation information may be provided to presentation module 38 for presentation to an emergency operator through a user interface.

Figure 7:
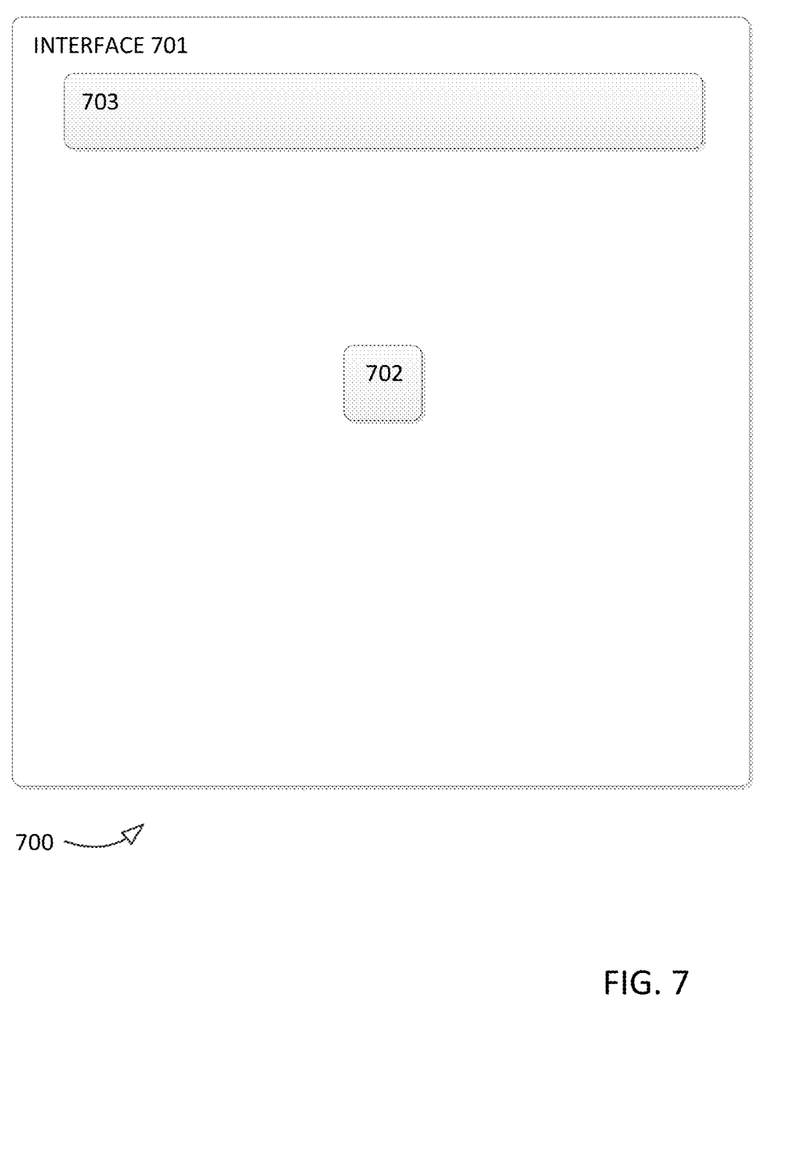
FIG. 7 illustrates a view of an exemplary interface for providing location information, in accordance with one or more implementations.

By way of illustration, FIG. 7 illustrates a view 700 of a user interface 701 as presented to a particular caller by a web-hosting module and/or a web resources. The particular caller may access, engage, interact with and/or activate a link to the web resources, e.g. through execution of a browser software application on the particular wireless mobile device. The link may have been included in a textual message transmitted on behalf of an emergency operator, in particular during and/or in response to an emergency call being placed to and/or being handled by the emergency operator at an emergency call center. User interface 701 may be presented through (a browser software application on) a client device, in particular an emergency calling device, e.g. a smartphone.

Elements of user interface 701 may be implemented as fields configured to receive entry, selection, and/or confirmation from a user. The fields may include one or more of a text entry field, a set of selectable menu items, a selectable field, and/or other fields configured to receive entry, selection, and/or confirmation from a user. The number of elements, components, and/or (user-selectable) fields depicted in FIG. 7 is meant to be exemplary, and not limiting in any way. User interface 701 may be configured to present information to and/or enable interaction with the user viewing view 700. User interface 701 of FIG. 7 may include interface elements 702 and 703, and/or other components or features. Element 703 may display information, including but not limited to instructions related to the use of the web resources. Element 702 may, e.g., be an object, interface, and/or other item that a user may interact with, such as a menu of user-selectable options and/or actions for engaging the system. Information displayed in user interface 701 may prompt and/or request the user to engage and/or activate element 702, e.g. depicted as a button labeled "Ok", to provide (current) geolocation information from the user's wireless mobile device to the web resources and/or to a constituent component of the system such as a presentation module. Element 702, upon activation by the user, may effect sharing and/or transmission of the geolocation information, e.g. as described elsewhere in this disclosure.

Referring to FIG. 1, users may participate in system 100 through client devices 14, emergency calling devices 17, and/or other devices. For example, interaction may be controlled through control inputs and/or commands input by the users through client devices 14 and/or emergency calling device(s) 17. By way of non-limiting example, input from users may be entered using interface devices including, but not limited to, a telephone, a keypad, buttons, switches, a keyboard, knobs, levers, a display screen, a touch screen, speakers, a microphone, an indicator light, an audible alarm, a printer, and/or any combinations thereof. By way of non-limiting example, client devices 14 and/or emergency calling devices 17 may include one or more of a desktop computer, a laptop computer, a handheld computer, a NetBook, a tablet, a smartphone, a gaming console, and/or other computing platforms. Note that the depictions of devices and/or icons used in FIG. 1 are not intended to be limiting in any way.

Referring to FIG. 1, server(s) 12, client device(s) 14, and/or emergency calling devices 17 may include electronic storage 50. Electronic storage 50 may comprise electronic storage media that electronically stores information. The functionality of electronic storage 50 may be similar between different instantiations, even if the stored information may be different. The electronic storage media of electronic storage 50 may include one or both of system storage that is provided integrally (i.e., substantially non-removable) and/or removable storage that is removably connectable to server(s) 12 and/or client device(s) 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables server(s) 12 and/or client device(s) 14 to function as described herein.

Server(s) 12 and client device(s) 14 may include processor(s) 110. Processor(s) 110 may be configured to provide information processing capabilities in server(s) 12 and/or client device(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some implementations, processor(s) 110 may include a plurality of processing units. These processing units may be physically located within the same device, or processor(s) 110 may represent processing functionality of a plurality of devices operating in coordination. The processor(s) 110 may be configured to execute modules 32-40, and/or other modules. Processor 110 may be configured to execute modules 32-40, and/or other modules by software; hardware; firmware; some combination of software, hardware, and/or firmware; and/or other mechanisms for configuring processing capabilities on processor(s) 110.

It should be appreciated that although modules 32-40 are illustrated in FIG. 1 as being co-located within a single processing unit, in implementations in which processor(s) 110 includes multiple processing units, one or more of modules 32-40 may be located remotely from the other modules. The description of the functionality provided by the different modules 32-40 described below is for illustrative purposes, and is not intended to be limiting, as any of modules 32-40 may provide more or less functionality than is described. For example, one or more of modules 32-40 may be eliminated, and some or all of its functionality may be provided by other ones of modules 32-40. As another example, processor 110 may be configured to execute one or more additional modules that may perform some or all of the functionality attributed herein to one of modules 32-40.

It is noted that the division of functionality between server(s) 12 and client device(s) 14 is not intended to be limited by this disclosure. Functions described in relation with server(s) 12 may be performed and/or shared by one or more other components of system 100, including client device(s) 14, and/or vice versa.

Figure 2:
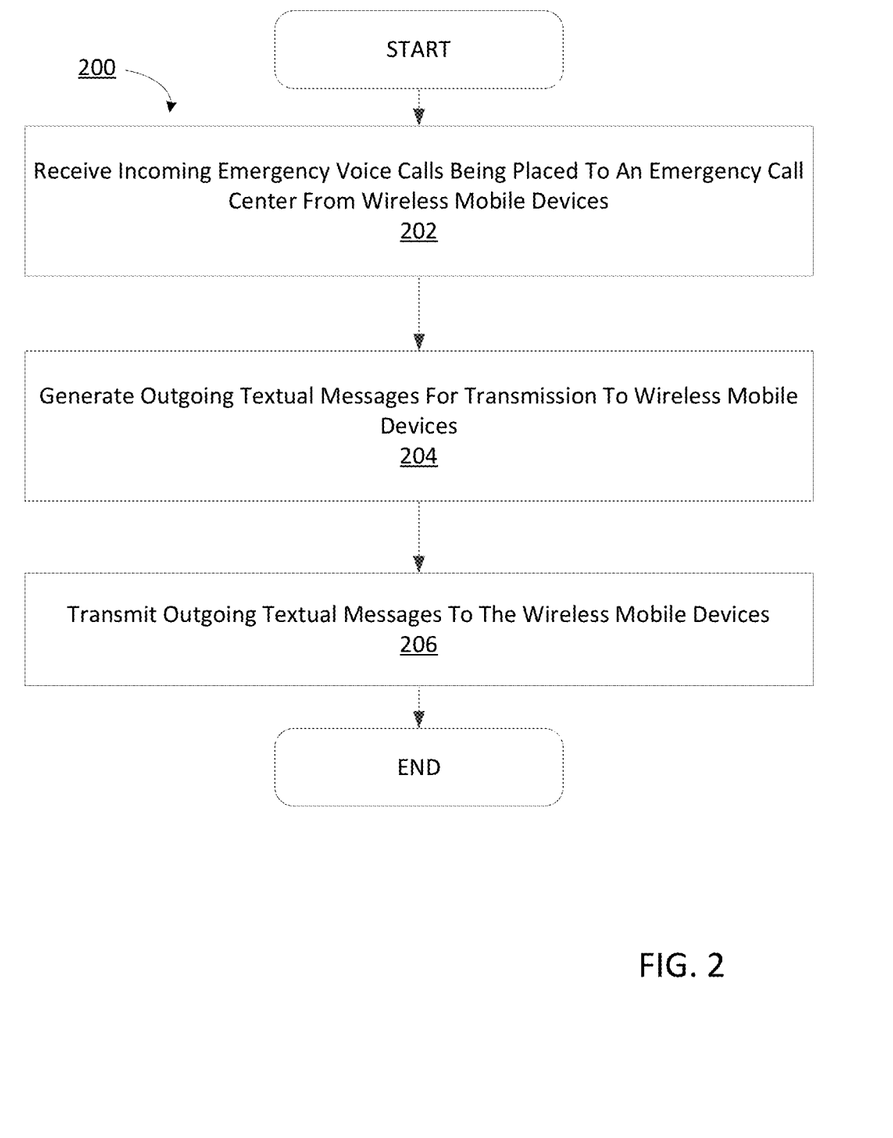
FIGS. 2-4 illustrate methods for communication through textual messages, in accordance with one or more implementations.
Figure 3:
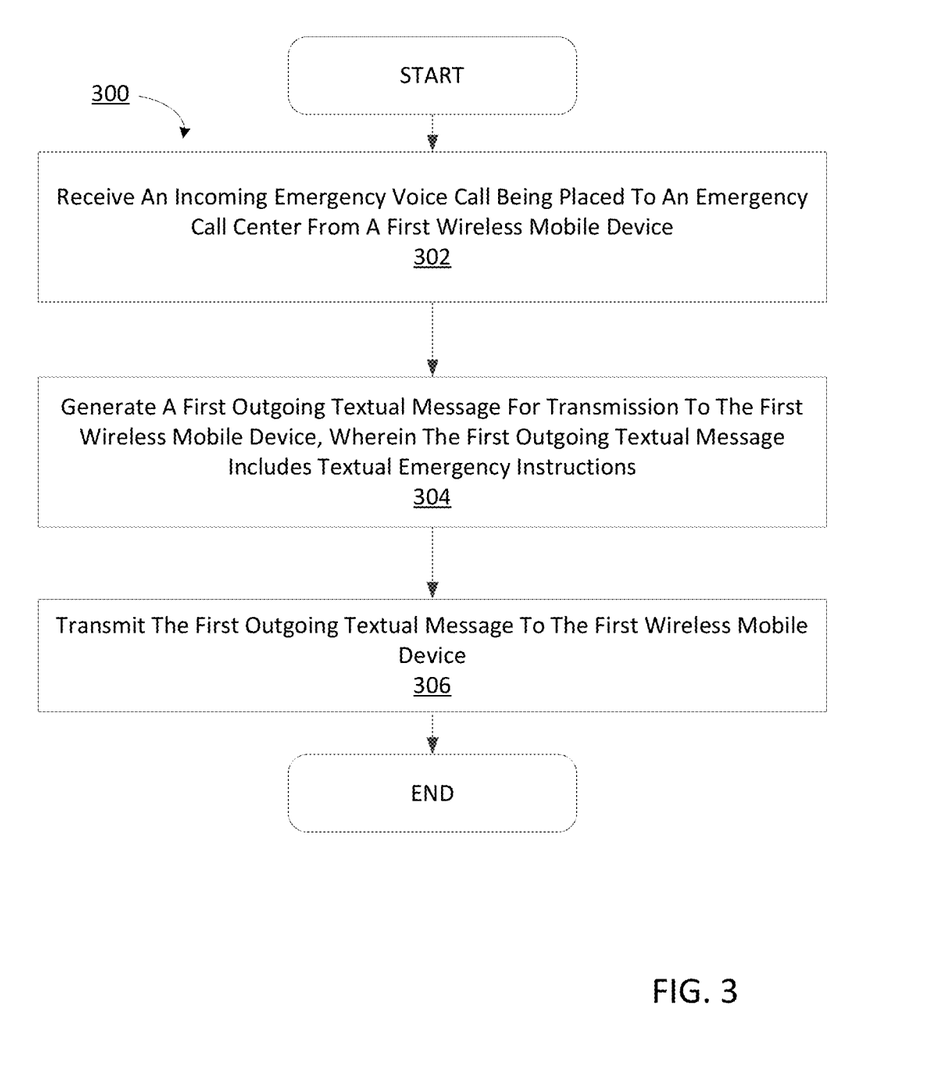
Figure 4:
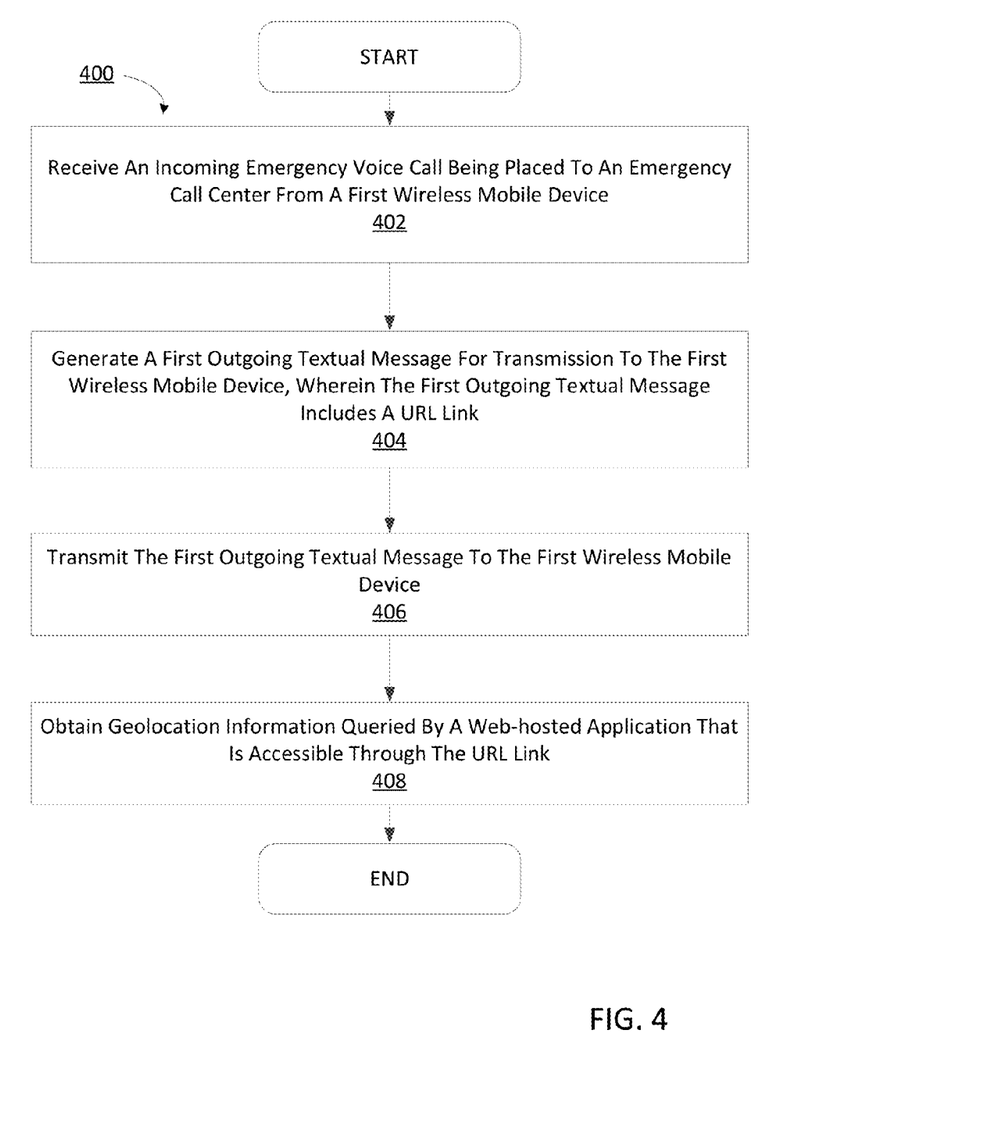
Figure 5:
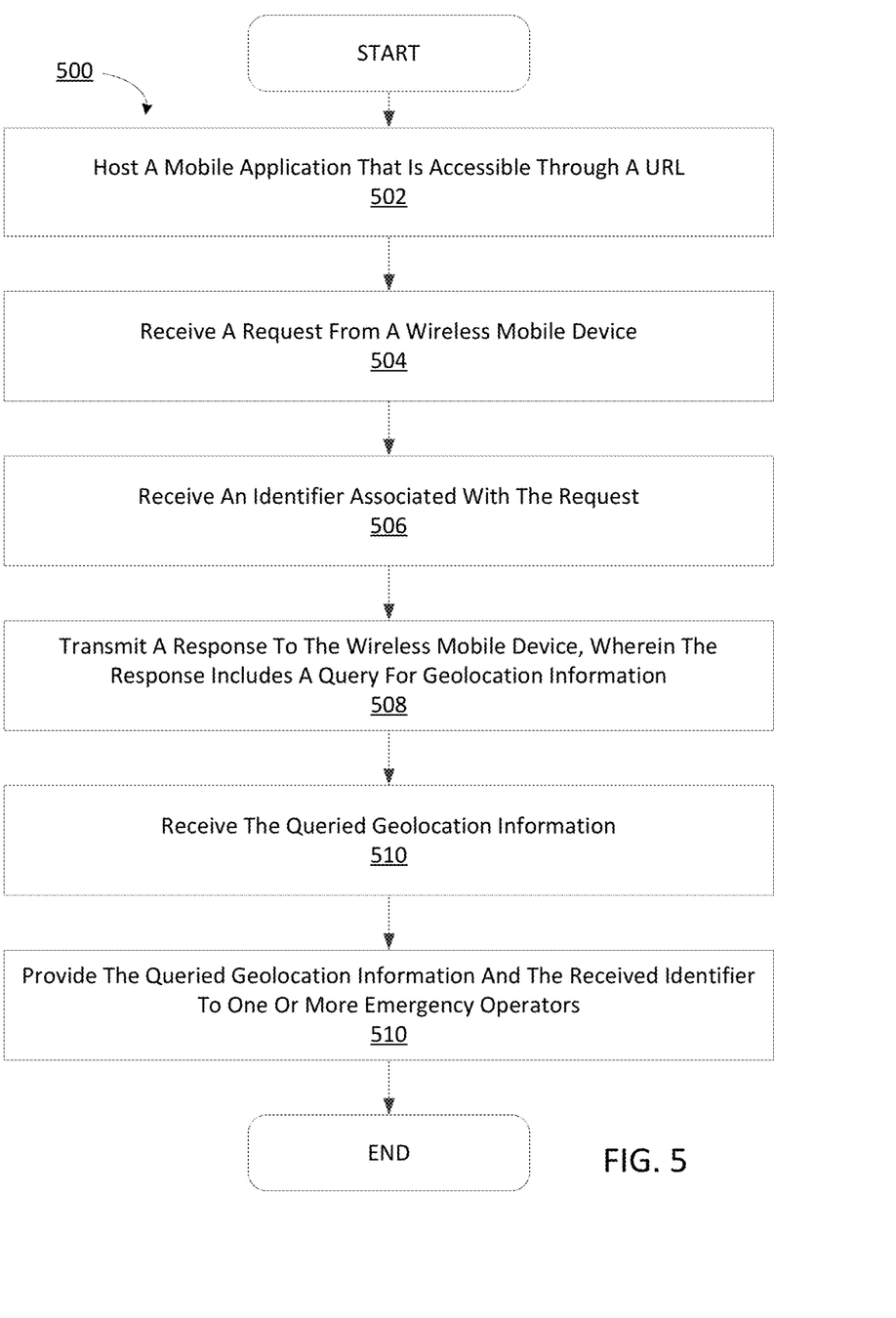
FIG. 5 illustrates a method for providing location information to emergency operators, in accordance with one or more implementations.

FIGS. 2, 3, and 4 illustrate methods 200, 300, and 400, respectively, for providing, to emergency operators, communication through textual messages, in accordance with one or more implementations. FIG. 5 illustrates a method 500 for providing location information to emergency operators, in accordance with one or more implementations. The operations of methods 200, 300, 400, and 500 presented below are intended to be illustrative. In some implementations, methods 200, 300, 400, and 500 may be accomplished with one or more additional operations not described, and/or without one or more of the operations discussed. Additionally, the order in which the operations of methods 200, 300, 400, and 500 are illustrated in FIGS. 2, 3, 4, and 5 and described below is not intended to be limiting.

In some implementations, methods 200, 300, 400, and 500 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of methods 200, 300, 400, and 500 in response to instructions stored electronically on an electronic storage medium. The one or more processing devices may include one or more devices configured through hardware, firmware, and/or software to be specifically designed for execution of one or more of the operations of methods 200, 300, 400, and 500.

Referring to FIG. 2, at an operation 202, incoming emergency voice calls are received that have been placed to an emergency call center through an emergency communications network. The emergency voice calls have been placed from wireless mobile devices. The incoming emergency voice calls include a first voice call from a first wireless mobile device. In some embodiments, operation 202 is performed by a call reception module the same as or similar to call reception module 32 (shown in FIG. 1 and described herein).

At an operation 204, outgoing textual messages are generated for transmission to wireless mobile devices from which incoming emergency voice calls are received such that a first outgoing textual message is generated for transmission to the first wireless mobile device based on the first voice call. In some embodiments, operation 204 is performed by an outgoing message module the same as or similar to outgoing message module 34 (shown in FIG. 1 and described herein).

At an operation 206, the outgoing textual messages are transmitted to the appropriate wireless mobile devices through a second communications network that is different than the emergency communications network such that the first outgoing textual message is transmitted to the first wireless mobile device through the second communications network. In some embodiments, operation 206 is performed by a transmission module the same as or similar to transmission module 36 (shown in FIG. 1 and described herein).

Referring to FIG. 3, at an operation 302, incoming emergency voice calls are received that have been placed to an emergency call center through an emergency communications network. The emergency voice calls have been placed from wireless mobile devices. The incoming emergency voice calls include a first voice call from a first wireless mobile device. In some embodiments, operation 302 is performed by a call reception module the same as or similar to call reception module 32 (shown in FIG. 1 and described herein).

At an operation 304, outgoing textual messages are generated for transmission to wireless mobile devices from which incoming emergency voice calls are received such that a first outgoing textual message is generated for transmission to the first wireless mobile device based on the first voice call. The first outgoing textual message includes textual emergency instructions. In some embodiments, operation 304 is performed by an outgoing message module the same as or similar to outgoing message module 34 (shown in FIG. 1 and described herein).

At an operation 306, the outgoing textual messages are transmitted to the appropriate wireless mobile devices such that the first outgoing textual message is transmitted to the first wireless mobile device. In some embodiments, operation 306 is performed by a transmission module the same as or similar to transmission module 36 (shown in FIG. 1 and described herein).

Referring to FIG. 4, at an operation 402, incoming emergency voice calls are received that have been placed to an emergency call center through an emergency communications network. The emergency voice calls have been placed from wireless mobile devices. The incoming emergency voice calls include a first voice call (by a caller) from a first wireless mobile device. In some embodiments, operation 402 is performed by a call reception module the same as or similar to call reception module 32 (shown in FIG. 1 and described herein).

At an operation 404, outgoing textual messages are generated for transmission to wireless mobile devices from which incoming emergency voice calls are received such that a first outgoing textual message is generated for transmission to the first wireless mobile device based on the first voice call. The first outgoing textual message includes a uniform resource locator (URL) link to a web-hosted application configured to query and/or prompt the first wireless mobile device and/or the caller for location information. In some embodiments, operation 404 is performed by an outgoing message module the same as or similar to outgoing message module 34 (shown in FIG. 1 and described herein).

At an operation 406, the outgoing textual messages are transmitted to the appropriate wireless mobile devices such that the first outgoing textual message is transmitted to the first wireless mobile device. In some embodiments, operation 406 is performed by a transmission module the same as or similar to transmission module 36 (shown in FIG. 1 and described herein).

At an operation 408, the location information is obtained, responsive to the first wireless mobile device being queried. In some embodiments, operation 408 is performed by a presentation module the same as or similar to presentation module 38 (shown in FIG. 1 and described herein).

Referring to FIG. 5, at an operation 502, a web resources is hosted that is accessible through a uniform resource locator (URL) address. In some embodiments, operation 502 is performed by a web-hosting module the same as or similar to web-hosting module 40 (shown in FIG. 1 and described herein).

At an operation 504, a request is received from a wireless mobile device. In some embodiments, operation 504 is performed by a web-hosting module the same as or similar to web-hosting module 40 (shown in FIG. 1 and described herein).

At an operation 506, an identifier is received that is associated with the request. In some embodiments, operation 506 is performed by a web-hosting module the same as or similar to web-hosting module 40 (shown in FIG. 1 and described herein).

At an operation 508, a response is transmitted to the wireless mobile device. The response includes a query for location information. In some embodiments, operation 508 is performed by a web-hosting module the same as or similar to web-hosting module 40 (shown in FIG. 1 and described herein).

At an operation 510, the queried location information is received from the wireless mobile device. In some embodiments, operation 510 is performed by a web-hosting module the same as or similar to web-hosting module 40 (shown in FIG. 1 and described herein).

At an operation 512, the queried location information and the received identifier are provided to one or more emergency operators. In some embodiments, operation 512 is performed by a web-hosting module the same as or similar to web-hosting module 40 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the claims. For example, it is to be understood that the present technology contemplates that, to the extent possible, one or more features of any implementation can be combined with one or more features of any other implementation.

What is claimed is:

1. A system configured to provide, to emergency operators, communication through textual messages, the system comprising:

one or more processors configured to execute computer program modules, the computer program modules comprising:
a call reception module configured to receive incoming emergency voice calls being placed to an emergency call center through an emergency communications network from wireless mobile devices, the incoming emergency voice calls including a first voice call placed from a first wireless mobile device;
an outgoing message module configured to generate outgoing textual messages for transmission to wireless mobile devices from which incoming emergency voice calls are received such that a first outgoing textual message is generated for transmission to the first wireless mobile device based on the first voice call;
a transmission module configured to transmit the outgoing textual messages to the appropriate wireless mobile devices through a second communications network that is different than the emergency communications network such that the first outgoing textual message is transmitted to the first wireless mobile device through the second communications network;
a presentation module configured to present incoming emergency voice calls to emergency operators through a user interface, wherein the user interface includes a set of user-selectable options, and wherein the presentation module is further configured to receive user input from emergency operators to select one or more of the set of user-selectable options; and a web-hosting module configured to host web resources configured to:
(i) query wireless mobile devices for location information; and
(ii) share, responsive to receipt of location information, received location information with the presentation module;

wherein the first outgoing textual message includes a uniform resource locator (URL) link to the web resources; and wherein the presentation module is further configured to present shared queried location information to emergency operators through the user interface.

2. The system of claim 1, wherein the set of user-selectable options correspond to different informational requests associated with the incoming emergency calls such that the first voice call is associated with a first informational request, and wherein the first informational request is included in the first outgoing textual message.

3. The system of claim 2, wherein the first informational request includes emergency instructions.

4. The system of claim 1, wherein the first outgoing textual message includes a link to emergency instructions.

5. The system of claim 1, wherein the outgoing textual messages include one or both of short message service (SMS) messages and/or multimedia messaging service (MMS) messages.

6. The system of claim 1, wherein the transmission module is further configured to receive textual messages from wireless mobile devices through the second communications network.

7. The system of claim 6, wherein the presentation module is further configured to present received textual messages through the user interface.

8. The system of claim 1, wherein the web resources is configured to query wireless mobile devices for location information through an application programming interface (API) function that accesses one or both of global positioning system (GPS) information and/or geolocation information.

9. A computer-implemented method for providing, to emergency operators, communication through textual messages, the method being performed by one or more processors configured to execute computer program modules, the method comprising:

receiving incoming emergency voice calls being placed to an emergency call center through an emergency communications network from wireless mobile devices, the incoming emergency voice calls including a first voice call from a first wireless mobile device;

generating outgoing textual messages for transmission to wireless mobile devices from which incoming emergency voice calls are received such that a first outgoing textual message is generated for transmission to the first wireless mobile device based on the first voice call;

transmitting the outgoing textual messages to the appropriate wireless mobile devices through a second communications network that is different than the emergency communications network such that the first outgoing textual message is transmitted to the first wireless mobile device through the second communications network;

presenting incoming emergency voice calls to emergency operators through a user interface, wherein the user interface includes a set of user-selectable options;

receiving user input from emergency operators to select one or more of the set of user-selectable options; querying, through web resources, wireless mobile devices for location information;

sharing, responsive to receipt of location information, received location information with the presentation module;

and presenting shared queried location information to emergency operators through the user interface.

10. The method of claim 9, wherein the set of user-selectable options correspond to different informational requests associated with the incoming emergency calls such that the first voice call is associated with a first informational request, and wherein the first informational request is included in the first outgoing textual message.

11. The method of claim 10, wherein the first informational request includes emergency instructions.

12. The method of claim 9, wherein the first outgoing textual message includes a link to emergency instructions.

13. The method of claim 9, wherein the outgoing textual messages include one or both of short message service (SMS) messages and/or multimedia messaging service (MMS) messages.

14. The method of claim 9, wherein querying wireless mobile devices for location information includes accessing, through an application programming interface (API) function, one or both of global positioning system (GPS) information and/or geolocation information.

15. The method of claim 9, further comprising:
receiving textual messages from wireless mobile devices through the second communications network.

16. The method of claim 15, further comprising:
present received textual messages through the user interface.

* * * * *